(12) United States Patent
Kaylor

(10) Patent No.: US 6,990,548 B1
(45) Date of Patent: Jan. 24, 2006

(54) METHODS AND ARRANGEMENTS FOR CONFIGURING A PRINTER OVER A WIRELESS COMMUNICATION LINK USING A WIRELESS COMMUNICATION DEVICE

(75) Inventor: Richard L. Kaylor, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 763 days.

(21) Appl. No.: 09/595,582

(22) Filed: Jun. 15, 2000

(51) Int. Cl.
G06F 1/00 (2006.01)

(52) U.S. Cl. .............................. 710/305; 710/8; 710/10; 710/72; 713/1

(58) Field of Classification Search ........ 710/305–317, 710/62–65, 72, 8–19, 33–34, 73, 105; 455/419–424, 455/445–456; 370/466–468, 484–490; 713/1–2
See application file for complete search history.

(56) References Cited

U.S. PATENT DOCUMENTS

| | | | | |
|---|---|---|---|---|
| 5,237,663 A | * | 8/1993 | Srinivasan | 710/305 |
| 5,490,287 A | * | 2/1996 | Itoh et al. | 455/66 |
| 5,524,185 A | * | 6/1996 | Na | 358/1.15 |
| 5,602,854 A | * | 2/1997 | Luse et al. | 370/313 |
| 5,696,894 A | * | 12/1997 | Ono | 395/114 |
| 5,737,690 A | * | 4/1998 | Gutman | 455/38.1 |
| 5,778,256 A | * | 7/1998 | Darbee | 710/72 |
| 6,000,864 A | * | 12/1999 | Hanada | 400/62 |
| 6,012,103 A | * | 1/2000 | Sartore et al. | 710/8 |
| 6,034,621 A | * | 3/2000 | Kaufman | 340/825.44 |
| 6,072,595 A | * | 6/2000 | Yoshiura et al. | 358/400 |
| 6,131,040 A | * | 10/2000 | Knuutila et al. | 455/550.1 |
| 6,167,514 A | * | 12/2000 | Matsui et al. | 713/150 |
| 6,241,673 B1 | * | 6/2001 | Williams | 600/437 |
| 6,308,227 B1 | * | 10/2001 | Kumar et al. | 710/4 |
| 6,351,638 B1 | * | 2/2002 | Robinson | 455/418 |
| 6,418,324 B1 | * | 7/2002 | Doviak et al. | 455/556 |
| 6,434,644 B1 | * | 8/2002 | Young et al. | 710/63 |
| 6,470,189 B1 | * | 10/2002 | Hill et al. | 455/517 |
| 6,477,581 B1 | * | 11/2002 | Carpenter et al. | 709/238 |
| 6,493,104 B1 | * | 12/2002 | Cromer et al. | 358/1.15 |
| 6,496,927 B1 | * | 12/2002 | McGrane et al. | 713/1 |
| 6,529,522 B1 | * | 3/2003 | Ito et al. | 370/466 |
| 6,650,429 B2 | * | 11/2003 | Marshall et al. | 358/1.14 |
| 6,707,581 B1 | * | 3/2004 | Browning | 358/473 |
| 6,714,969 B1 | * | 3/2004 | Klein et al. | 709/219 |
| 6,912,651 B1 | * | 6/2005 | Hamdi et al. | 713/1 |
| 2001/0034227 A1 | * | 10/2001 | Subramanian et al. | |
| 2002/0099804 A1 | * | 7/2002 | O'Connor et al. | 709/220 |

* cited by examiner

Primary Examiner—Paul R. Myers
Assistant Examiner—Raymond N Phan

(57) ABSTRACT

A portable communication device, such as, a cellular telephone, pager, PDA, etc., is programmed to configure a peripheral device through a communication link. The advanced user interface on the portable communication device tends to provide a more efficient mechanism for configuring the peripheral device. The portable communication device is arranged to transmit the configuration information directly to the peripheral device over the communication link. The portable communication device may also be further interfaced to a computer that is arranged to identify the necessary configuration information to be provided to the peripheral device.

6 Claims, 3 Drawing Sheets

METHODS AND ARRANGEMENTS FOR CONFIGURING A PRINTER OVER A WIRELESS COMMUNICATION LINK USING A WIRELESS COMMUNICATION DEVICE

TECHNICAL FIELD

The present invention is related to computers, and more particularly to methods and arrangements for configuring a peripheral device using a portable handheld device.

BACKGROUND

Computer networks are commonplace in today's working environment and are steadily making their way into the home environment. These computer networks can be configured to provide intraconnectivity and/or interconnectivity between various computing resources. These networks are particularly advantageous for environments that have shared resources, such as, for example, a printing device, scanning device, facsimile device, data storage device, etc.

Configuring these various networked devices to operate together can be difficult, especially for novice users or system administrators, and/or for larger networks. In some cases, a system administrator may be required to physically visit each resource on the network and configure the resource using the resource's locally available configuration mechanisms. Thus, for example, a system administrator may be required to configure a printer using its user interface (e.g., buttons, display, etc.). In certain other networks, the system administrator may be able to configure or otherwise modify the network and its various resources via the network interface itself (i.e., assuming that the resources have already been configured with applicable network identifiers, addresses, etc.). Thus, for example, a system administrator may use one or more remotely hosted programs on a personal computer (PC) or the like to selectively configure shared resources by sending the appropriate information over the network interface.

Unfortunately, most networks do not have a simple universal remote programming capability available that will support the configuration of all or most of the shared resources. This is particularly true for networks that include a variety of resources from different manufacturers, each of whom may choose to provide or otherwise require a special programming mechanism, e.g., local control panel, switches, local or remote software programs, and the like.

Moreover, some network resources tend to be more difficult to initially set up and subsequently reconfigure because the user interface has been designed to more readily support the routine user input/output requirements associated with normal operations. By way of example, conventional printers tend to have simple user interfaces with limited display capabilities and only a few buttons. While such an arrangement typically provides for a more user friendly interface for those printing documents day in and day out, the limited display and buttons tend to make the configuration process more difficult. For example, most networks require that each of the resources be assigned a unique identifier, such as, an Internet Protocol (IP) address. To configure a printer with its assigned address or to change its address, the user or system administrator will need to enter the new information through the existing user interface. Unfortunately, the user-friendly interfaces provided with most printers do not include a full numerical and/or alphanumerical keypad that might be convenient for entering such network identifier information. Additionally, most printers have limited display capabilities, e.g., 16 character or perhaps 32 character wide displays, that may further hinder the user when entering lengthy configuration information.

This is not to say that printers cannot be configured as required, only that the existing interfaces tend to make the job more difficult. For example, some printers provide a scrolling display of selectable alphanumeric characters that can be navigated using only a few input buttons. While this obviously works, it tends to be slower, especially for lengthy addresses wherein the user is forced to scroll up or down through several characters until the appropriate character is located.

Consequently, there is a need for improved methods and arrangements for controlling, configuring or otherwise interfacing with various computing resources, such as, peripheral devices. Preferably, the improved methods and arrangements will provide a simple, user-friendly and cost-effective user interface for more routine operations, while also providing a faster, more efficient and convenient user interface for advanced configuring and/or controlling operations.

SUMMARY

The present invention provides improved methods and arrangements for controlling, configuring or otherwise interfacing with various computing resources, such as, for example, peripheral devices. In accordance with certain aspects of the present invention, the improved methods and arrangements provide a simple, user-friendly and cost-effective user interface for routine operations, and a faster, more efficient and convenient user interface for advanced configuring and/or controlling operations.

Thus, for example, the above stated needs and others are met by a portable communication device, such as, a cellular telephone, pager, PDA, etc., that is programmed to configure a peripheral device through a communication link. The advanced user interface on the portable communication device tends to provide a more efficient mechanism for configuring the peripheral device. The portable communication device can be arranged to transmit the configuration information directly to the peripheral device over the communication link. The portable communication device may also be further interfaced to a computer that is arranged to identify the necessary configuration information to be provided to the peripheral device.

BRIEF DESCRIPTION OF THE DRAWINGS

A more complete understanding of the various methods and arrangements of the present invention may be had by reference to the following detailed description when taken in conjunction with the accompanying drawings wherein.

DETAILED DESCRIPTION

Figure 1:
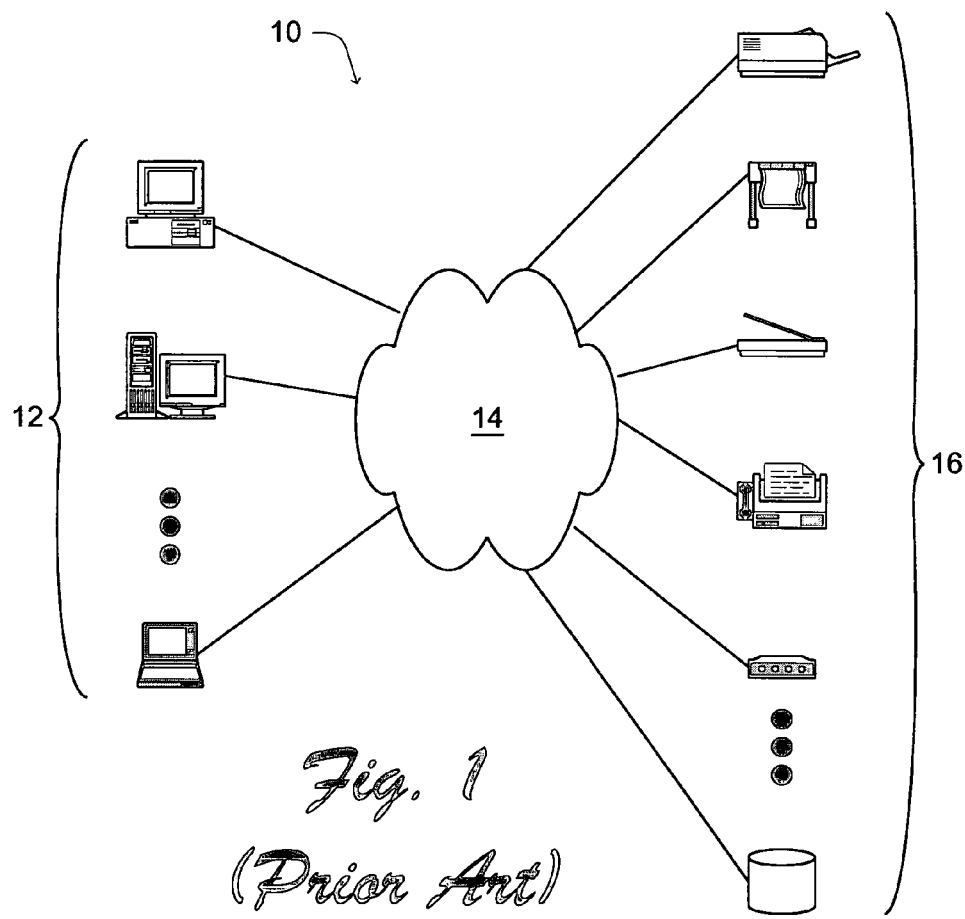
FIG. 1 is a block diagram depicting an exemplary computer network environment having at least one computer and one peripheral device.

FIG. 1 depicts an exemplary computer network environment 10 having at least one computer 12 operatively coupled through at least one network 14 to at least one peripheral device 16.

As graphically illustrated, a computer 12 can include a personal computer (PC), a workstation computer, a server, a portable computer, or other like computing devices that are configurable to access one or more peripheral devices 16, through network 14.

Network 14 may include dedicated communication resources, local area networks (LANs), wide area networks (WANs), intranets, the Internet, and the like that are configured to carry information between a computer 12 and a peripheral device 16. Network 14 will likely be configured for use in accordance with one or more conventional networking protocols, such as, e.g., TCP/IP, etc.

Peripheral device 16 can include, for example, a printer, a plotter, a scanner, a facsimile machine, a modem, a data storage device, an input/output (I/O) device, or other types of shared resource devices.

As stated above, there is often a need to configure or reconfigure computer network environment 10 and its various components. For example, when a new peripheral device 16 is added to network 14, there is a need to configure the new peripheral device 16 so that a computer 12 may access it. This usually requires programming the peripheral device 16 with a unique network identifier, such as, e.g., an IP address.

Figure 2:
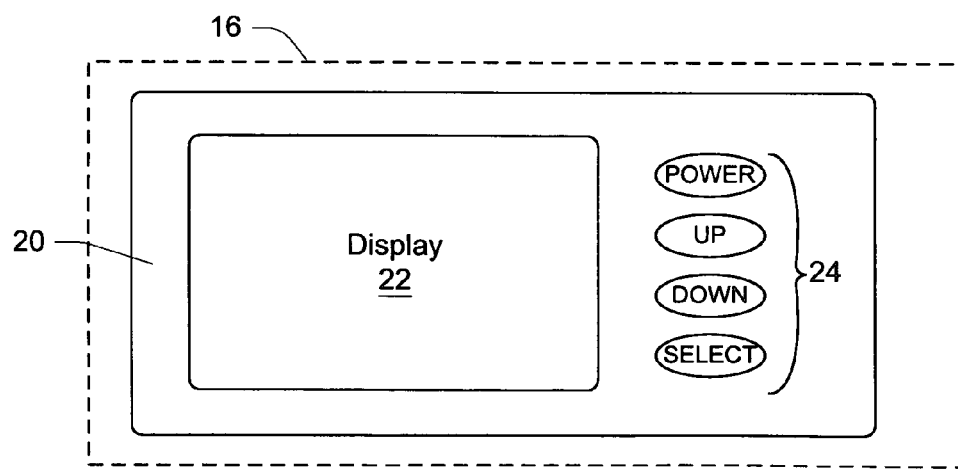
FIG. 2 is a representative diagram of a conventional user interface of an exemplary peripheral device for use in the computer network of FIG. 1.

With this in mind, FIG. 2 is a representative diagram of a conventional user interface 20 of an exemplary peripheral device 16, such as, a printer. As depicted, user interface 20 has been designed to provide a simple, user-friendly interface environment. In this example, user interface 20 includes a display 22 and a plurality of buttons 24. Display 22 typically includes a liquid crystal display or other like alphanumeric display mechanism that is configured to display a limited amount of information to the user. For example, in certain printers, one or two 16 or 32 character display lines are provided to identify the operational status of the printer. The user is able to control certain actions of the printer through buttons 24, based on the information presented in display 22.

As depicted in this example, buttons 24 may include a power button, a scroll up button, a scroll down button, and a selection button. It is recognized that other buttons and/or functions may be provided, depending on the type of peripheral device 16.

While the various methods and arrangements disclosed herein are equally adaptable to a variety of peripheral devices 16, for the sake of brevity, this description will focus on certain peripheral devices, such as, printers, that have been designed to avoid overloading user interface 20 with a full gamut of buttons, e.g., as might be required to readily program peripheral device 16 with applicable configuration information. Additionally, manufacturing cost factors may also lead to a reduced number of buttons, etc.

The example in FIG. 2 is one such user interface. Here, a user or system administrator will be required to selectively scroll through and/or otherwise manipulate selectable functions/inputs/characters as presented in display 22. Thus, for example, to configure peripheral device 16 with a new IP address, the user will need to navigate through one or more menus, etc., shown on display 22 until the correct entry field(s) (not shown) are presented. To enter the new IP address information into the entry field(s), the user will then need to use one or more of buttons 24 to identify and select the character to be entered. For an IP address having a fairly long multiple decimal point delimited numerical sequence, such a scroll/identify and select process can be time consuming. Likewise, entering other configuration and control information in this manner can be inefficient.

Figure 3:
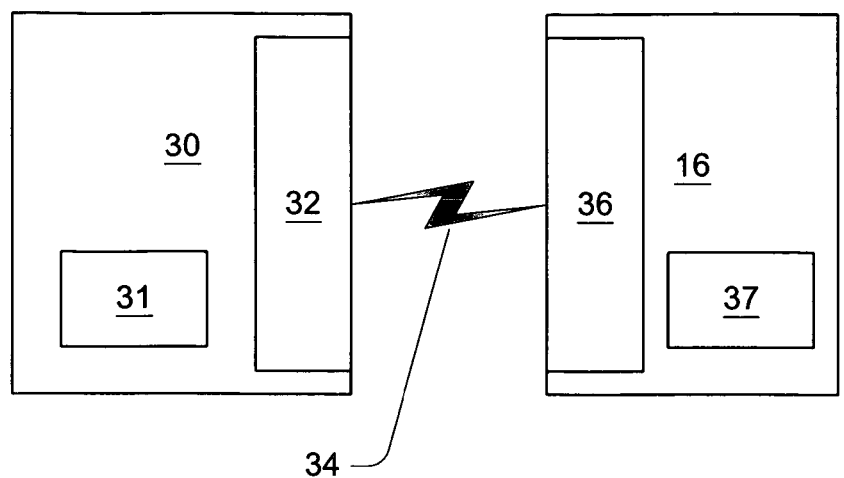
FIG. 3 is a block diagram depicting the use of a portable communication device to configure, control or otherwise communicate with a peripheral device, for example, as in FIG. 1.

FIG. 3 is a block diagram depicting the use of a portable communication device 30 to configure, control or otherwise communicate with a peripheral device 16, in accordance with certain implementations of the present invention. In this example, portable communication device 30 may include a cellular telephone, a pager, a personal digital assistant (PDA), a portable computer, a special-purpose portable communication device (e.g., a dedicated or universal remote control), or the like that is configured to selectively communicate with peripheral device 16. Preferably, portable communication device 30 will provide a more efficient mechanism for configuring, controlling or otherwise communicating with peripheral device 16.

With this in mind, as depicted portable communication device 30 includes logic 31 and a communication interface 32. Logic 31 is configured to allow the user to input information into portable communication device 30, e.g., for example, through a display 52 and keypad 54 (see FIG. 5), selectively store/process the information, and provide at least a portion of the information to communication interface 32. In certain implementations, logic 31 may also be configured to receive and process inputs from communication interface 32.

Communication interface 32 is operatively configured to transmit at least a portion of the information received from logic 31 to peripheral device 16 over a communication link 34. In certain preferred implementations, communication link 34 represents an infrared (IR) signal transmitted through the atmosphere by communication interface 32. In certain implementations, communication link 34 represents a radio frequency (RF) signal transmitted through the atmosphere by communication interface 32. In still other implementations, communication link 34 represents an electrical or optical signal that is transmitted through an applicable cable or fiber by communication interface 32.

In certain implementations, communication link 34 may provide for unidirectional or bi-directional communications between portable communication device 30 and peripheral device 16.

As shown, peripheral device 16 includes a corresponding communication interface 36 that is configured to receive the applicable signal provided via communication link 34. Additional logic 37 is also provided within peripheral device 16 and configured to receive/process the information provided over communication link 34. Thus, logic 37 may be arranged to configure peripheral device 16 or otherwise control the operation of peripheral device 16, based on the received/processed information.

Those skilled in the art will recognize that logic 31 and logic 37 may each be implemented in a variety of ways, including the use of hardware, software, firmware, or any combination thereof, depending upon the support capability of the portable communication device 30 and peripheral device 16, respectively.

As presented in FIG. 3, logic 31 is preferably configured to provide an intelligent step-by-step configuration process, a menu-driven process, or other like process, that provides the user with the capability to quickly and efficiently configure or control peripheral device 16.

Figure 4:
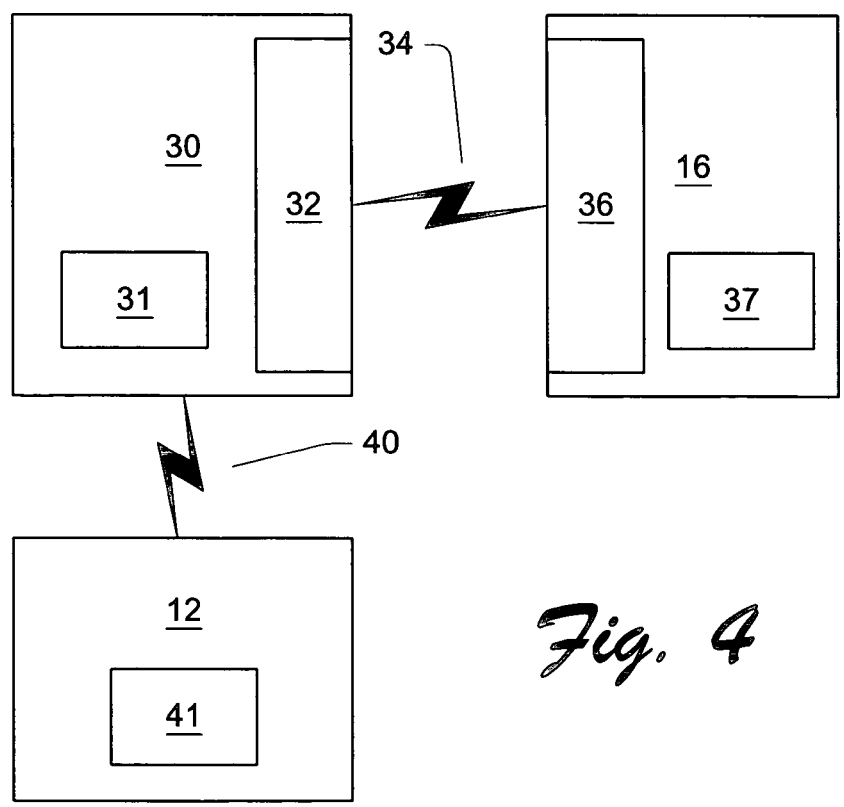
FIG. 4 is a block diagram depicting the use of a portable communication device to transport configuration, control or other information between a computer and at least one peripheral device, for example, as in FIG. 1.

In accordance with certain further implementations, portable communications device 30 is also capable of interfacing with corresponding logic provided in a computer 12. Reference is now made to FIG. 4, which depicts the use of portable communication device 30 to transport configuration, control or other information between a computer 12 and peripheral device 16. Here, logic 41 is provided within computer 12 and configured to at least provide such information to logic 31 through communication link 40. Logic 41 may also be configured to receive information from logic 31 through communication link 40.

Thus, for example, the user may first generate the appropriate configuration/control information for peripheral device 16 using logic 41 in computer 12. Logic 41 may include a configuration programming application or the like that outputs the configuration data based on user inputs. This configuration programming application may be similar to a conventional remote program that is designed to configure peripheral device 16 over network 14, for example.

The resulting configuration information from logic 41 is then provided to logic 31 over communication link 40, which may be the same type as communication link 34 or different. For example, communication link 40 may include a traditional serial communications port, a universal serial bus (USB) port, an IEEE-1394 port, etc., that is used to synchronize, or otherwise operatively connect portable communication device 30 to computer 12.

Once the applicable configuration/control information has been transferred to portable communication device 30, it can then be processed, as necessary and provided to peripheral device 16, as described above over communication link 34.

Figure 5:
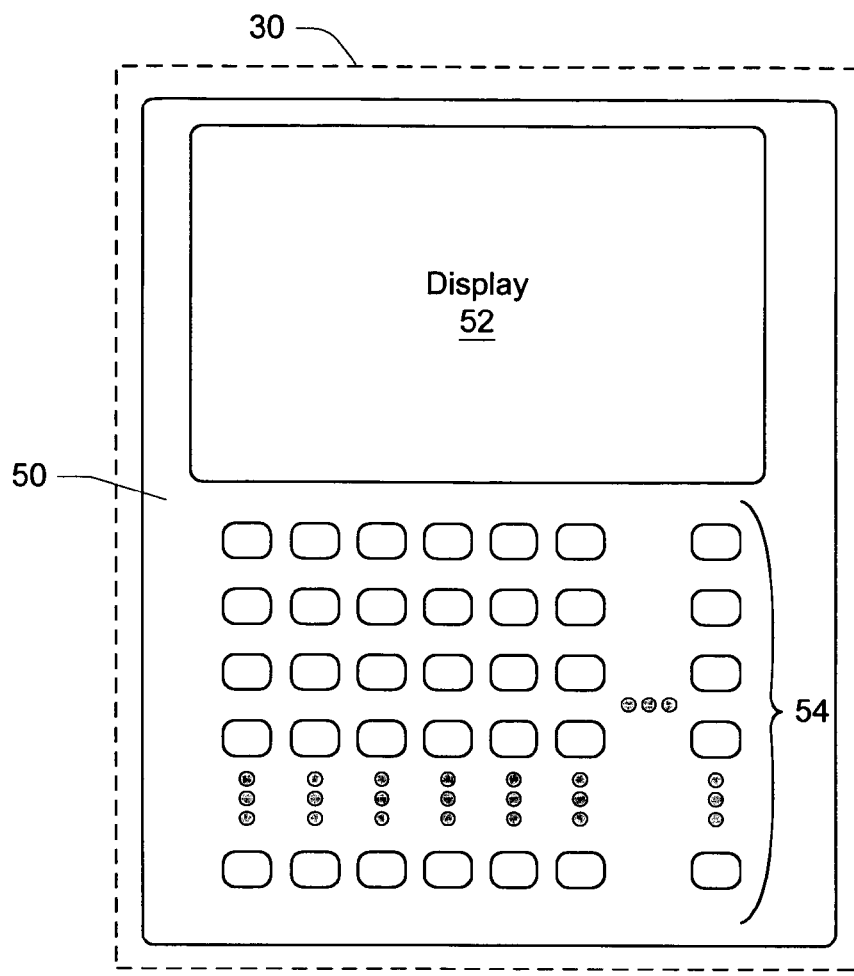
FIG. 5 is a representative diagram of an exemplary conventional user interface suitable for use in a portable communication device, for example, as in FIGS. 3 and 4.

One of the important aspects of the methods and arrangements described herein is that portable communication device 30 and/or computer 12 is able to provide a more advanced and efficient user interface than that which is typically provided by peripheral device 16 alone. By way of example, FIG. 5 depicts portable communication device 30 having a user interface 50 that includes a display 52 and a keypad 54. Here, display 52 is preferably capable of showing more information than the traditional display 22 on peripheral device 16. As such, the user will be able to view configuration and control information without necessarily having to scroll through the displayed text.

Likewise, keypad 54 preferably includes a greater number of buttons than would a typical peripheral device user interface 20. In certain configurations, keypad 54 includes at least a full set of numerical input keys. In other implementations, keypad 54 includes a full set of alphanumeric keys.

In still other implementations, user interface 50 can be configured to input information and display information in languages other than English. Thus, for example, portable communication device 30 may be configured to input and display information in Japanese, German, etc. In this manner, portable communication device 30 may provide for a more personal and efficient user interface capability; one that the peripheral device may not be capable of performing given its place of manufacture.

Additionally, portable communication device 30 may also be configured to receive, process, display, and/or subsequently transfer other information, such as, peripheral device status information, logged information and/or error related information. As such, portable communication device 30 may further increase the user's ability to monitor and adjust the operational performance of peripheral device 16 and/or computer network environment 10.

One of the complaints that many system administrators and other maintenance users have registered is that they are less inclined to implement solutions that require them to purchase and carry about additional hardware or devices. In accordance with certain implementations of the present invention, such users need not necessarily purchase or carry about additional devices because portable communication device 30 can be implemented using devices that they may already carry with them. For example, most of these users tend to carry either a cellular telephone or a pager, each of which may be configured to provide a more efficient user interface capability, as described above. By way of example only, Nokia currently manufactures cellular telephones having numeric keypads along with alphabetic character keypads. Many users also carry a PDA, such as, e.g., a Palm device, handheld device or Pocket PC device, that are readily programmable to perform the above functions with display 52 and keypad 54 being implemented through a touch screen. Furthermore, such devices are already configured to operatively interface with a computer 12 through cables and/or a comparable IR port.

Although some preferred implementations of the various methods and arrangements of the present invention have been illustrated in the accompanying Drawings and described in the foregoing Detailed Description, it will be understood that the invention is not limited to the exemplary implementations disclosed, but is capable of numerous rearrangements, modifications and substitutions without departing from the spirit of the invention as set forth and defined by the following claims.

What is claimed is:

1. A method comprising:

maintaining printing device control information in a wireless communication device, the printing device control information including network configuration information associated with a printing device and a network that is operatively coupled to the printing device, wherein the network configuration information includes a unique network device address of the printing device for use in the network;

selectively transmitting the printing device control information to the printing device over a wireless communication interface, and wherein the wireless communication interface is not part of the network;

receiving the printing device control information using the printing device; and configuring the printing device to operate on the network using the network configuration information within the received printing device control information.

2. The method as recited in claim 1, wherein the wireless communication device is selected from a group of wireless communication devices comprising a wireless telephone and a pager.

3. The method as recited in claim 1, wherein the wireless communication interface is configured to carry at least one signal selected from a group of signals comprising a radio frequency (RF) signal, and an infrared (IR) signal.

4. The method as recited in claim 1, wherein maintaining the printing device control information in the wireless communication device further includes receiving the printing device control information through a user interface portion of the wireless communication device.

5. The method as recited in claim 3, wherein the wireless communication interface is further configured to provide bi-directional communication between the wireless communication device and the printing device.

6. The method as recited in claim 4, wherein the user interface portion of the wireless communication device includes a display and a keypad.

* * * * *